United States Patent [19]

Ausnit

[11] Patent Number: 4,528,224
[45] Date of Patent: Jul. 9, 1985

[54] METHOD OF MAKING MULTIPLE RECLOSABLE BAG MATERIAL

[75] Inventor: Steven Ausnit, New York, N.Y.

[73] Assignee: Minigrip, Inc., Orangeburg, N.Y.

[21] Appl. No.: 416,619

[22] Filed: Sep. 10, 1982

[51] Int. Cl.³ .............................................. B32B 7/08
[52] U.S. Cl. ....................................... 428/36; 156/66;
156/204; 156/259; 383/63; 383/97; 428/57;
428/223; 493/196; 493/214; 493/223
[58] Field of Search ................ 156/66, 164, 204, 257,
156/259; 383/63, 97; 493/194, 195, 196, 214,
223; 428/36, 57, 223

[56] References Cited

U.S. PATENT DOCUMENTS

| | | | |
|---|---|---|---|
| 3,219,084 | 10/1961 | Ausnit et al. | 150/3 |
| 3,608,439 | 2/1970 | Ausnit | 93/35 R |
| 3,679,511 | 2/1970 | Ausnit | 156/251 |
| 3,780,781 | 12/1973 | Uramoto | 150/3 |
| 3,948,705 | 4/1976 | Ausnit | 156/73.4 |
| 4,279,677 | 7/1981 | Takahashi | 156/160 |
| 4,341,575 | 7/1982 | Herz | 156/66 |

Primary Examiner—Robert A. Dawson
Attorney, Agent, or Firm—Hill, Van Santen, Steadman & Simpson

[57] ABSTRACT

A method of making multiple reclosable bag material, which comprises advancing from a supply source bag wall film in continuous strip form and providing confronting colinear wall panel portions with surfaces facing toward one another, feeding separable fastener assembly in continuous strip form from a supply source into corunning relation between the wall panel portions, and permanently securing to the wall panel portion surfaces oppositely facing base surfaces of the fastener assembly. The material thus formed is adapted to be split longitudinally into a plurality of bag material strip sections adapted to be sealed across at spaced intervals into bag units.

14 Claims, 7 Drawing Figures

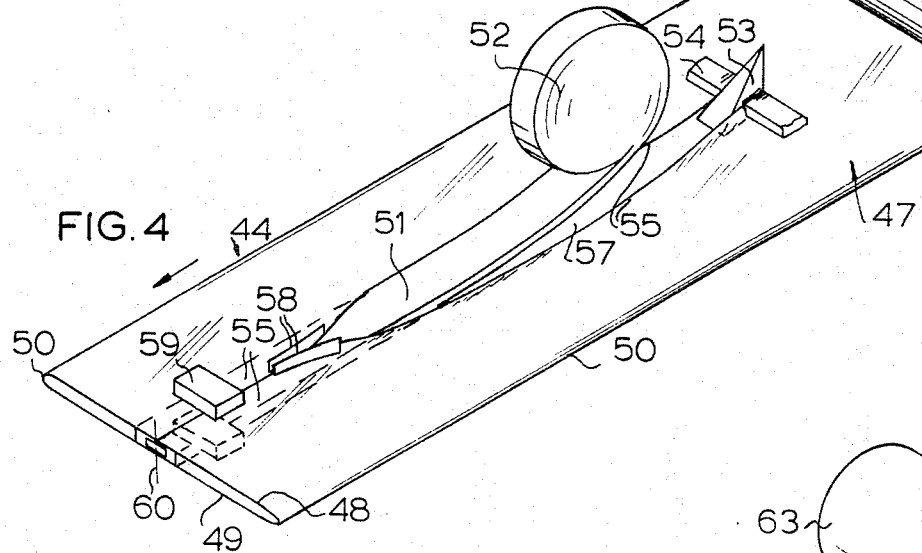
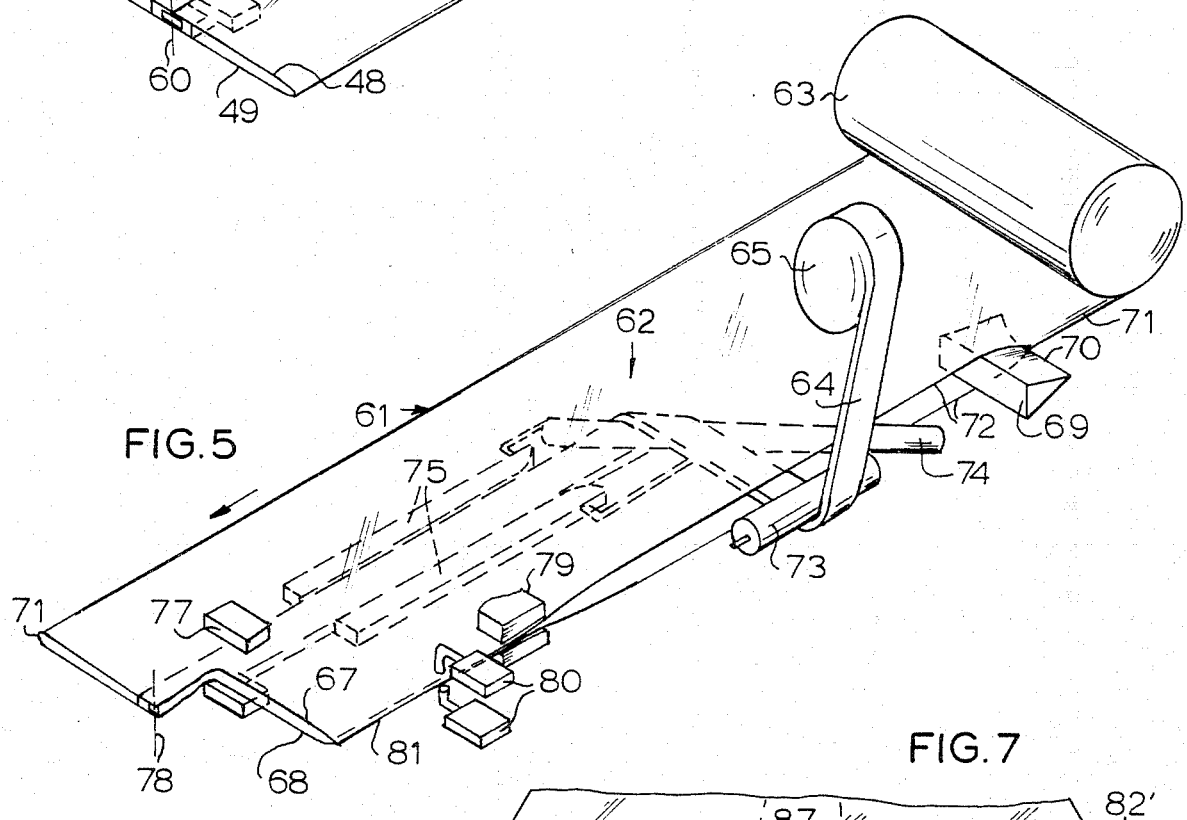

METHOD OF MAKING MULTIPLE RECLOSABLE BAG MATERIAL

This invention relates to improvements in methods of forming material which is especially adapted for making multiple bags.

More particularly, the present invention concerns a new and improved method for joining bag wall film and separable fastener strip means in a simple manner for high speed production of improved bags.

Heretofore, the practice in preparing multiple plastic bags with reclosable fasteners thereon has required that the profiled fastener strips have upper base web surfaces attached to surfaces of at least one of the confronting wall panel portions of the bag material, that is, bag wall surface areas of the completed bags. By way of example, U.S. Pat. No. 3,948,705 is referred to. As disclosed in that patent, flattened tubular material is cut open along a centrally longitudinal area of one of the confronting bag wall portions and the separable fastener assembly, including separable fastener closures for both of the multiple bag sections of the material, is joined with the front bag wall panel portions by lapping the lateral flanges on one side of the fastener assembly with the surface areas along the cut in the one panel. The other side of the fastener assembly has a lower base web surface laid against the inside of the other wall panel. Then, the fastener assembly is separated by an anvil and the separated parts of the assembly are heat welded.

In the patented method, the anvil between the wall panel portions and the parts of the fastener assembly to be secured to said portions is essential to the method. Further, where it is desired to have the finished bags equipped with pull flanges at the open end, only one of the pull flanges may comprise a laminate of a flange of the fastener strip and a marginal portion of the contiguous sidewall, while the opposite fastener element which is attached to the face of the associated wall panel cannot have the desirable laminar pull flange, because the margin of the associated front wall panel that is attached to the fastener element must stop short of the profiles thereof to avoid interference with the mating of said profiles with the profiles of the fastener element on the opposite wall panel.

Other prior U.S. patents which are exemplary of forming multiple reclosable bag material are U.S. Pat. Nos. 3,219,084; 3,608,439; and 3,679,511, all of which are also characterized by the necessity for attaching flanges of the fastener assemblies to the outside marginal surfaces of one of the wall panel portions.

An important object of the present invention is to provide a new and improved method of making multiple reclosable bag material, wherein separable fastener assembly means are assembled to confronting surfaces of the bag wall film wall panel portions, and permanent securement is adapted to be effected without separating the fastener assembly.

Pursuant to the present invention, there is provided a method of making multiple reclosable bag material, comprising advancing from a supply source bag wall film in continuous strip form and providing confronting co-linear wall panel portions with surfaces facing toward one another, feeding separable fastener assembly means in continuous strip form from a supply source into corunning relation between the wall panel portions, and permanently securing to the panel portion surfaces oppositely facing base surface of the fastener assembly.

Other objects, features and advantages of the invention will be readily apparent from the following description of representative embodiments thereof, taken in conjunction with the accompanying drawings although variations and modifications may be effected without departing from the spirit and scope of the novel concepts embodied in the disclosure and in which:

FIG. 4 is a schematic illustration of another mode of practicing the invention;

FIG. 5 is a schematic illustration of a further mode of practicing the present invention;

FIG. 6 illustrates bag material produced according to the present method adapted for use in producing bottom open bags; and FIG. 7 shows a modified arrangement for bottom open bags from multiple reclosable bag material produced according to the present invention.

Figure 1:
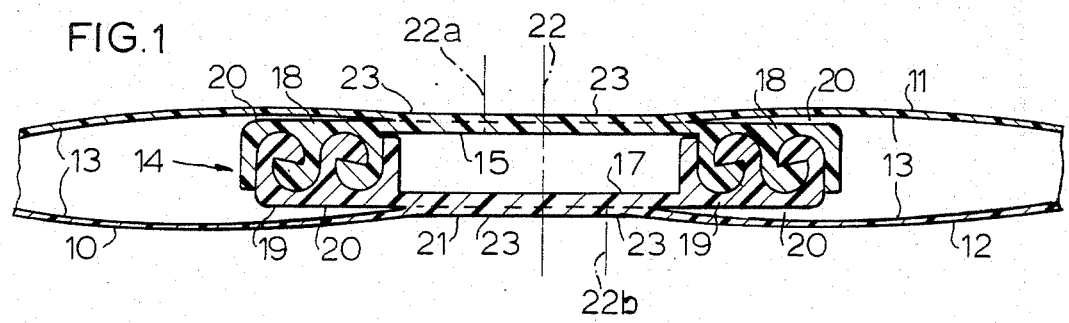
FIG. 1 is a fragmentary enlarged transverse sectional detail view showing multiple reclosable bag material produced according to the method of the present invention.

Referring to FIG. 1, multiple reclosable bag material 10 produced according to the method of the present invention comprises bag wall film, preferably of a suitable extruded plastic material, providing colinear wall panel portions 11 and 12 with respective surfaces 13 facing toward one another.

Separable fastener assembly means 14 colinear with and located between the panel portions 11 and 12 comprises extruded plastic, complementary resiliently flexible fastener profile sections, one of which has an upper base web 15 and the other of which has a lower base web 17. These base webs 15 and 17 are of substantial width and have along each opposite edge a separable zipper profile structure, comprising profile structures 18 on the web 15 and complementary profile structures 19 on the web 17. The profile structures 18 and 19 in this instance are of the well known complementary plural rib and groove type.

Oppositely facing base surfaces 20 of the fastener strips are permanently secured, in the present instance, along the webs 15 and 17 to the panel portion surfaces 13 in any suitable fashion, such as by heat welding as indicated at 21 and which effects fusion of the laminated surfaces. In this instance, the base surfaces 20 along the profile heads or sections 18 and 19 are allowed to remain free from attachment to the wall surfaces 13 so that the wall panels 11 and 12 may expand relative to the joined profiles without opening the fastener.

Separation of the multiple reclosable bag material into two separate bag forming strip sections is adapted to be effected along a longitudinal line 22 midway between the opposite edges of the base webs 15 and 17. The reclosable bag material may also be adapted to be separated at two locations with the upper base web being cut closer to one profile as at 22a and with the lower web being cut closer to the other profile as at 22b, thereby resulting in pull flanges of different lengths on the finished bags. This provides respective multi-thickness bag mouth opening pull flanges 23 comprising the separated portions of the webs 15 and 17 and the margins of the wall panels 11 and 12 to which they are laminated. By making possible a heavier pull flange, it becomes easier to separate the interlocking profiles of the finished bag. It will be understood, of course, that the separated multiple reclosable bag material strip sections will be eventually divided transversely into separate bag units.

Figure 2:
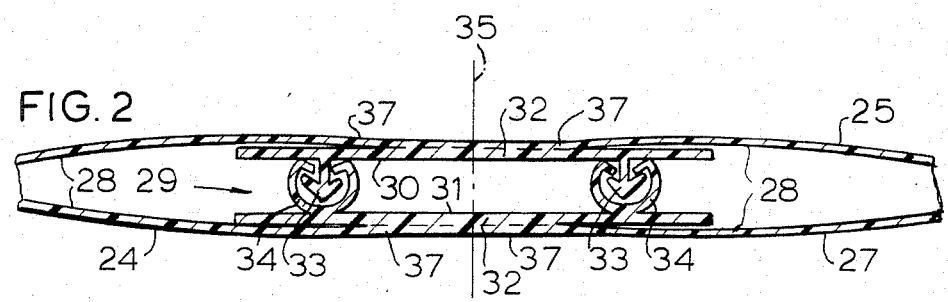
FIG. 2 is a similar sectional view showing a modified form of the fastener profiles.

In the modified multiple reclosable bag material 24, as shown in FIG. 2, confronting colinear wall panel portions 25 and 27 have respective surfaces 28 facing toward one another and provided therebetween with colinear separable fastener assembly means 29 of the type wherein respective upper and lower coextensive base webs 30 and 31 have their oppositely facing base surfaces permanently secured as by means of heat fusion welding 32 to the wall panel portion surfaces 28. In this instance, the fastener strips are provided with complementary separably interlocking males profiles 33 on the upper base web 30 and female profiles 34 on the lower base web 31. Alternately, each web could carry a male and female profile that interlocks with the complementary profiles of the other base web. By separating the multiple reclosable bag material 24 along a longitudinal line 35 midway of the webs 31, the bag strips into which the material 24 is divided will have respective multi-thickness pull flanges 37 comprising the fused together segments of the webs 30 and 31 and the margins of the panels 25 and 27.

Figure 3:
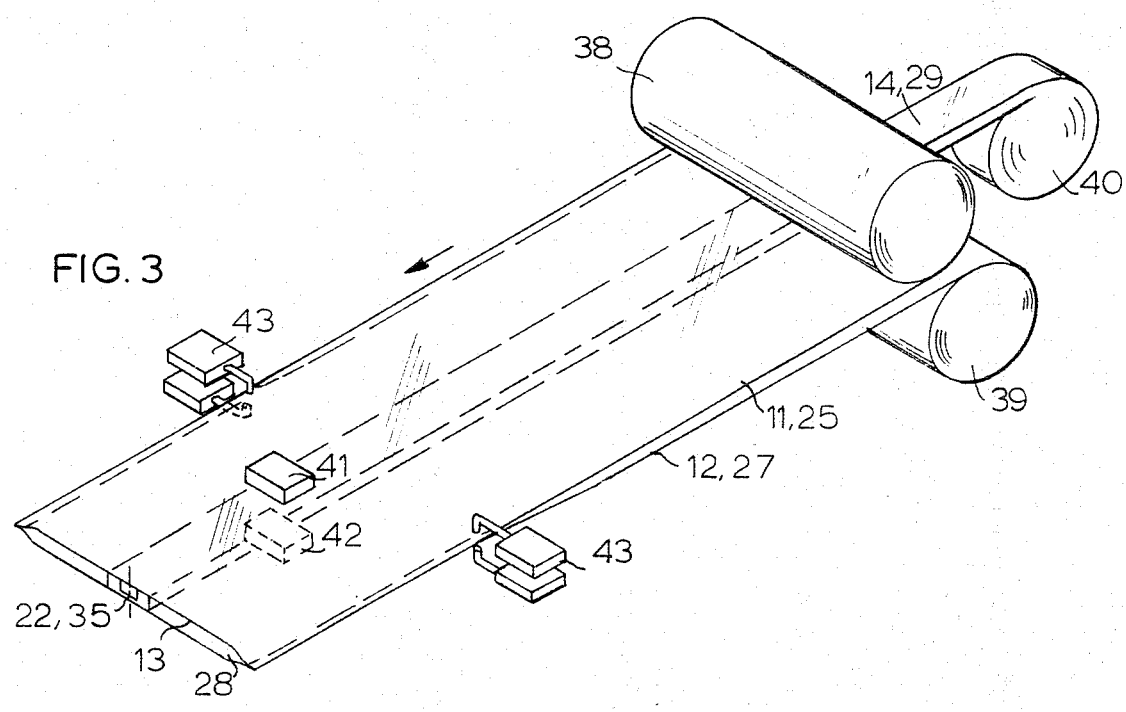
FIG. 3 is a schematic illustration of one preferred mode of practicing the present invention.

Both embodiments of the multiple reclosable bag material, 10 and 24, are adapted to be made according to the method exemplified in FIG. 3. To this end, bag wall film 11, or 25, is advanced in continuous strip form from a supply source such as a roll 38, and bag wall film 12 or 27 is advanced in continuous strip form from a supply source such as a roll 39, thereby providing confronting colinear wall panel portions with surfaces 13 or 28, facing toward one another. Separable fastener assembly means 14 or 29, in continuous strip form is fed from a supply source such as a roll 40 into corunning relation between the panel portions 11 or 25 and 12 or 27. As will be observed, the continuous, corunning relation between the panel portions and the fastener assembly means is along a common longitudinal axis, in this instance, centered between the wall panel portions 11 or 25 and 12 or 27.

Permanent securement of the confronting panel portion surfaces 13 or 28, to the oppositely facing base surfaces of the fastener assembly means 14 or 29, is effected by means of heat welding heads 41 and 42 disposed on respectively opposite sides, which, as shown, are the top and bottom sides of the bag wall film and separable fastener assembly means sandwich. This effects welding of the laminar surfaces of the wall film and fastener assembly to attain either of the permanent fused securement as demonstrated in FIGS. 1 and 2.

Although the outer edge margins of the wall panel portions 11 or 25 and 12 or 27 may be left open for bottom bag filling of the subsequently separated bag section strips, the wall panel portion margins may, as shown, be heat fusion sealed as by means of a seal head assembly 43 at each of the opposite margins. Thereafter, by severing the assembly along the longitudinal line 22 or 35 into two bag section strips, the ultimate bag units will be adapted to be filled from the top by opening the respective separable fasteners, and then reclosing the fasteners to retain the bag contents.

As shown in FIG. 4, the method of making multiple reclosable bag material 44 may comprise advancing from a supply source such as a roll 45 bag plastic wall film 47 which has been fabricated by extrusion in tubular form and collapsed for convenient winding into the roll 45, from which the film is advanced as a continuous strip which is provided with confronting colinear wall panel portions 48 and 49 joined along opposite margins by closed juncture bends 50. For feeding separable fastener assembly means 51 in continuous strip form from a supply source such as a roll 52 into corunning relation between the wall panel portions 48 and 49, one of the panel portions, herein the panel portion 48, is slit open along a longitudinal line preferably midway of the width of the panel portions. For this purpose, a slitting edge device 53 is mounted on a suitable supporting frame 54 and with the edge of the slitter facing upstream relative to the direction of advance of the film 47. In addition to slitting the web wall panel portion 48, the device 53 functions as a spreader so that margins 55 of the panel portion 48 along the slit are spread apart to provide a longitudinal gap 57 of sufficient width to receive the fastener assembly 51 therethrough to be sandwiched between the wall panel portions 48 and 49. After the corunning fastener assembly means 51 has entered through the slit, the margins 55 are closed into edge-to-edge relation, as depicted, over the fastener assembly 51 as by means of a closing guide device 58. Heat sealing or welding of the inwardly facing surfaces of the margins 55, and the inner surface of the wall panel 49, to the oppositely facing upper base surfaces of the fastener assembly means 51 may be effected by heat sealing head means 59. Thereafter, the permanently secured wall panel and fastener assembly means may be longitudinally divided along a line 60 which may be coincident with the joint between the edges of the margins 55, into two bag strip sections to be ultimately divided into top filling bag units.

Referring to FIG. 5, another arrangement is shown for making multiple reclosable bag material 61 utilizing bag wall film 62 in continuous strip form comprising collapsed tubularly extruded plastic film supplied from a suitable source such as a roll 63. In order to assemble separable fastener assembly means 64 derived from a suitable source such as a roll 65 into sandwiched position between the colinear wall panel portions 67 and 68 having inner surfaces facing toward one another, slitting and spreader means 69 has a slitting edge 70 facing upstream and located to slit open a juncture 71 along one edge of the collapsed film 62 and then spread margins 72 along the slit so that the fastener assembly means 64 can be fed into position between the wall panels 67 and 68. Such feeding is adapted to be effected by training the fastener assembly means strip 64 about a guide roller 73 into the slit between the margins 72 toward the longitudinal center between the wall panels 67 and 68 where a turn bar or roller device 74 turns the fastener strip assembly 64 into corunning relation longitudinally between the panels 67 and 68 and between longitudinal guides 75 which may be supported in assembly with the turn bar device 74. Permanent securement of the panel 67 and 68 to the oppositely facing upper and lower base surfaces of the fastener assembly strip means 64 is adapted to be effected as by means of a heat welding head 77. Downstream from the point where the fastener strip means 64 enters between the panels 67 and 68, a margin closure guide 79 closes the margins 72 together and means such as heat sealing head structure 80 may secure the margins 72 into a closed seam 81.

While all film and fastener material is indicated as coming from rolls, it is also possible that such components could come directly from one or more extrusion sources.

In all forms of the invention as shown in FIGS. 3, 4 and 5, it will be understood that suitable supporting, feeding, controlling and guiding means for the components, and then the assembly of the reclosable bag material will be provided as is generally accepted practice.

Where both of the reclosable bag material sections are to provide bottom open bags to facilitate filling the bags from the bottom while the separable closure means remains closed, multiple reclosable bag material 82 (FIG. 6) may be provided wherein both opposite edges of the assembly are open. This condition may be arrived at by forming the bag material according to the method as described in connection with FIG. 3, but omitting the marginal sealing step. Also, instead of having the edges of the bag wall film panel portions coextensive as in FIG. 6, the multiple reclosable bag material 82' as shown in FIG. 7 may have one of the panel portions 83' narrower than the opposite panel portion 84'. By having the panel portions 83' and 84' centered opposite one another, the margins of the panel portion 84' are offset laterally relative to the margins of the other panel portion 83'. In other respects, the bag material 82' may be the same as the bag material 82 in FIG. 6. On the other hand, this result may be attained by slitting both edges of a collapsed tube form of the film material by slitting both edges instead of only one edge as shown in FIG. 5, and then omitting sealing of the margins along the edge slits. In other respects, the bag material 82 may be substantially the same as in any of the described assemblies, that is, wall panel portions 83 and 84 will have separable fastener assembly means 85 longitudinally centrally permanently secured therebetween and then severed along a longitudinal line 87, between the spaced parallel separable fastener profile assemblies, into two bag strip sections adapted to be subdivided into bag units.

In all forms of the bag material produced according to the present invention, the margins of the wall panel portions laminated to the base webs of the fastener assemblies provide for multi-thickness pull flanges at the mouth ends of bags to be formed from the material, to facilitate digital manipulation for opening the separable closures. The bags are reclosable by pressing the fastener profiles together.

It will be understood that variations and modifications may be effected without departing from the spirit and scope of the novel concepts of this invention.

I claim as my invention:

1. A method of making multiple reclosable bag material, comprising:

advancing from a supply source bag wall film as a continuous ribbon and providing confronting colinear wall panel portions with surfaces facing toward one another and of a width sufficient to provide two continuous bag strip sections;

feeding a continuous length of double separable fastener assembly from a supply source into corunning relation between said wall panel portions and intermediate and spaced from the longitudinal sides of said wall panel portions, and wherein said fastener assembly has two coextensive webs which carry along confronting opposite longitudinal margins respective complementary resiliently flexible fastener profile sets which are separably interlocked and with substantial width areas of the webs intervening between the profile carrying margins on each of the webs and having respective oppositely facing base surfaces;

placing said web base surfaces respectively in laminar relation to said facing surfaces on superjacent parts of the bag wall film panel portions;

and permanently securing into a laminate each of said superjacent parts of said wall panel portions and only intermediate areas of the webs and leaving the profile carrying marginal portions of each of the webs free from the panel portion surfaces;

so that by longitudinally separating said laminates between and spaced from said fastener profile sets into separate bag making strips, each strip will have thereon one of said fastener profile sets and each strip will be provided with multi-layer pull flanges formed from said laminates and with both of the fastener carrying margins free from the panel portion surfaces on both wall panel portions of each strip.

2. A method according to claim 1, which comprises supplying said bag wall film as a pair of separate colinear films to provide said wall panel portions, feeding the separable fastener assembly into centered longitudinal relation between the panel portions, and sealing the edges of said colinear panel portions together along each side of the ribbon.

3. A method according to claim 1, which comprises supplying said bag wall film in the form of a collapsed tubular plastic extrusion which provides said panel portions, slitting one of said panel portions intermediate its longitudinal edges along a single line longitudinal slit to provide an entrance for said fastener assembly, spreading said one panel portion at edges along the entrance, feeding the fastener assembly into the entrance between the spread apart edges, closing said spread apart edges into edge-to-edge relation onto the adjacent base surface of the fastener assembly, and permanently securing said one panel portion and said edges to said adjacent base surface.

4. A method according to claim 1, which comprises supplying said bag wall film in the form of a collapsed tubular plastic extrusion having opposite edges, slitting the collapsed tubular extrusion along one edge, feeding the separable fastener assembly laterally through the slit thus formed, and then diverting the laterally fed fastener assembly into longitudinal relation between the wall panel portions.

5. A method according to claim 1, which comprises slitting said laminate along offset lines, and thereby providing separate bag making strips having pull flanges of differential lengths.

6. A method of making multiple reclosable bag material, comprising:

advancing from a supply source bag wall film as a continuous ribbon and providing confronting colinear wall panel portions with surfaces facing toward one another and of a width sufficient to provide two continuous bag strip sections;

feeding a continuous length of double separable fastener assembly from a supply source into corunning relation between said wall panel portions and intermediate and spaced from the longitudinal sides of said wall panel portions, and wherein said fastener assembly has two spaced coextensive webs having along confronting opposite longitudinal margins respective complementary resiliently flexible fastener profile sets which are separably interlocked and with substantial width areas of the webs intervening between the profiles on each of the webs and the webs having respective oppositely facing base surfaces;

permanently securing each of said web areas into a laminate with the respective subjacent of said wall panel portions;

and slitting said laminates longitudinally along respective substantially offset lines and thereby providing two bag making strips having differential length pull flanges along said fastener sets.

7. A method according to claim 1, comprising leaving portions of the fastener web surfaces back of the profile sets free from said wall panel portion surfaces.

8. A method of making multiple reclosable bag material, comprising:

advancing from a supply source bag wall film in the form of a collapsed tubular plastic extrusion wherein the collapsed extrusion provides colinear wall panel portions with surfaces facing toward one another;

slitting one of said wall panel portions along a longitudinal line intermediate the opposite edges of said one panel portion;

separating margins of said one panel portion along said slit to provide a longitudinal opening;

feeding a continuous length of double separable fastener assembly from a supply source through said longitudinal opening into corunning relation between said wall panel portions;

returning said one panel portion along said slit into coplanar relation and with the edges along said slit in edge-to-edge relation;

and permanently securing to said wall panel portion surfaces oppositely facing base surfaces of said fastener assembly.

9. A method according to claim 8, which comprises severing said wall panel portions and fastener assembly longitudinally along the closed slit into a pair of bag making material strips.

10. A method of making multiple reclosable bag material, comprising:

advancing from a supply source bag wall film in a continuous ribbon of collapsed tubular film extrusion having opposite edges and wherein the collapsed tubular extrusion provides confronting colinear wall panel portions with surfaces facing toward one another;

slitting one edge of the collapsed extrusion to provide an entrance into the collapsed extrusion;

feeding a continuous length of double separable fastener assembly from a supply source laterally through said entrance and then diverting the continuous length into corunning longitudinal relation between and in intermediate position between said wall panel portions;

permanently securing to said wall panel portion surfaces oppositely facing base surfaces of said fastener assembly;

and sealing said slit side edge closed downstream from said diverting of said fastener assembly.

11. A multiple reclosable bag material, comprising:

bag wall film in a continuous ribbon and providing confronting colinear wall panel portions with surfaces facing toward one another and of a width sufficient to provide two continuous bag strip sections;

a continuous length of double separable fastener assembly in colinear relation between said wall panel portions and intermediate and spaced from the longitudinal sides of the wall panel portions;

said fastener assembly having two coextensive webs which carry along confronting opposite longitudinal margins respective complementary resiliently flexible fastener profile sets which are separably interlocked and with substantial width areas of the webs intervening between the profile carrying margins on each of the webs and having respective oppositely facing base surfaces;

said web base surfaces being respectively in laminar relation to said facing surfaces on superjacent parts of the bag wall film panel portions;

and only intermediate areas of the webs being permanently secured into a laminate with superjacent parts of said wall panel portions and the profile carrying marginal portions of each of the webs being free from the panel portion surfaces;

so that the laminate is adapted to be longitudinally separated between and spaced from the fastener profile sets into separate bag making strips wherein each of the strips will have thereon one of said fastener profile sets and each strip will be provided with multi-layer pull flanges formed from said laminate and with both of the fastener carrying margins free from the panel portion surfaces on both wall panel portions of each strip.

12. A multiple reclosable bag material according to claim 11, wherein said bag wall film comprises a pair of separately formed colinear films providing said wall panel portions, said fastener assembly being in centered longitudinal relation between the panel portions, and the edges of said panel portions being secured together along each side of the ribbon.

13. A multiple reclosable bag material according to claim 11, wherein said film comprises a collapsed tubular plastic extrusion which provides said panel portions, said extrusion having a slit along one of the panel portions intermediate the longitudinal edges thereof along a single longitudinal line for entrance of said fastener assembly into the tubular extrusion, and edges of said one panel portion along said slit being located in edge-to-edge relation on the adjacent base surface of the fastener assembly and permanently secured thereto.

14. A multiple reclosable bag material according to claim 11, wherein said bag wall film comprises a collapsed tubular plastic extrusion having opposite edges, one of said edges having been split for feeding of the separable fastener assembly laterally through the slit thus formed into longitudinal relation between the wall panel portions.

* * * * *